United States Patent

[11] 3,625,343

| [72] | Inventor | Richard C. Talbot<br>Skokie, Ill. |
|---|---|---|
| [21] | Appl. No. | 871,345 |
| [22] | Filed | Oct. 17, 1969 |
| [45] | Patented | Dec. 7, 1971 |
| [73] | Assignee | Peters Machinery Company<br>Chicago, Ill.<br>Original application Apr. 1, 1968, Ser. No. 717,688, now Patent No. 3,500,984.<br>Divided and this application Oct. 17, 1969, Ser. No. 871,345 |

[54] CONVEYOR RECEIVING AND CONVEYING ROWS OF ARTICLES IN PRESELECTED GROUPS FOR WRAPPING
5 Claims, 5 Drawing Figs.

[52] U.S. Cl. .................................................. 198/179, 198/57
[51] Int. Cl. .................................................. B65g 17/16
[50] Field of Search .......................................... 198/179, 172, 176, 180, 57; 113/115

[56] References Cited
UNITED STATES PATENTS

| 1,290,888 | 1/1919 | Bracy | 198/179 X |
|---|---|---|---|
| 1,597,921 | 8/1926 | Okins | 198/57 |
| 2,822,653 | 2/1958 | Zinn et al. | 198/179 X |
| 2,884,117 | 4/1959 | Engleson et al. | 198/179 |
| 2,976,984 | 3/1961 | Moucrieff | 198/179 |
| 3,268,054 | 8/1966 | Murphy et al. | 198/179 X |

*Primary Examiner*—Joseph Wegbreit
*Assistant Examiner*—Bruce H. Stoner, Jr.
*Attorney*—Hill, Sherman, Meroni, Gross & Simpson ABSTRACT: Conveyor for receiving rows of articles, such as cookies, dropped onto the conveyor in preselected groups from above, and conveying the groups of articles in a single row for wrapping. The conveyor includes a single strand chain having a material carrying run movable in a generally horizontal plane and having sets of leading and trailing flights spaced along the chain and extending upwardly of the material carrying run of the conveyor. The flights are carried by attachments, pivotally connected to the chain to pivot about the axes of certain pintle pins of the chain. A series of cams engaged by followers on the attachments opens two flights at a receiving position to form in effect a hopper and receive a group of articles deposited from above, and closes the two flights to close the space between the articles and hold the articles in vertical positions for wrapping.

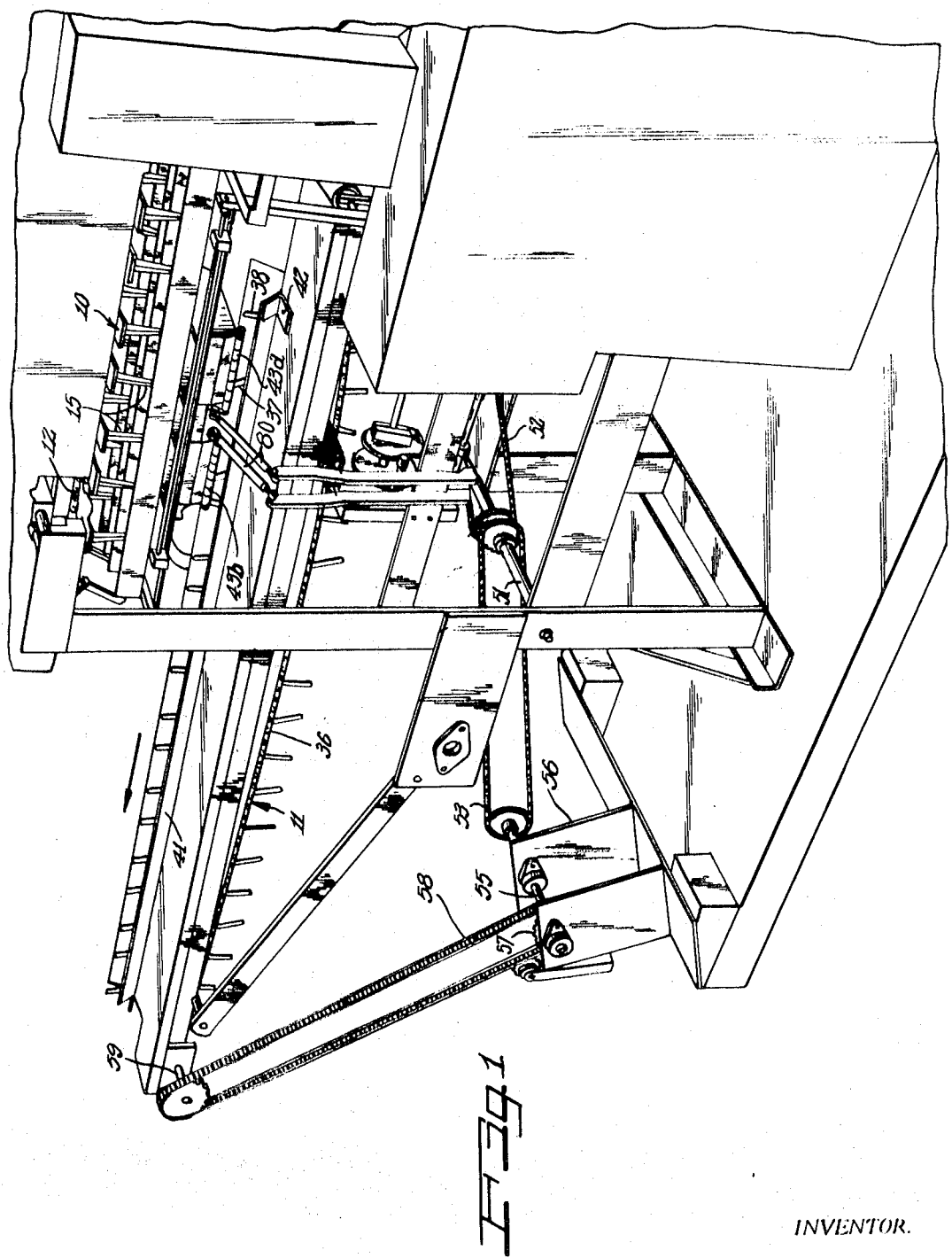

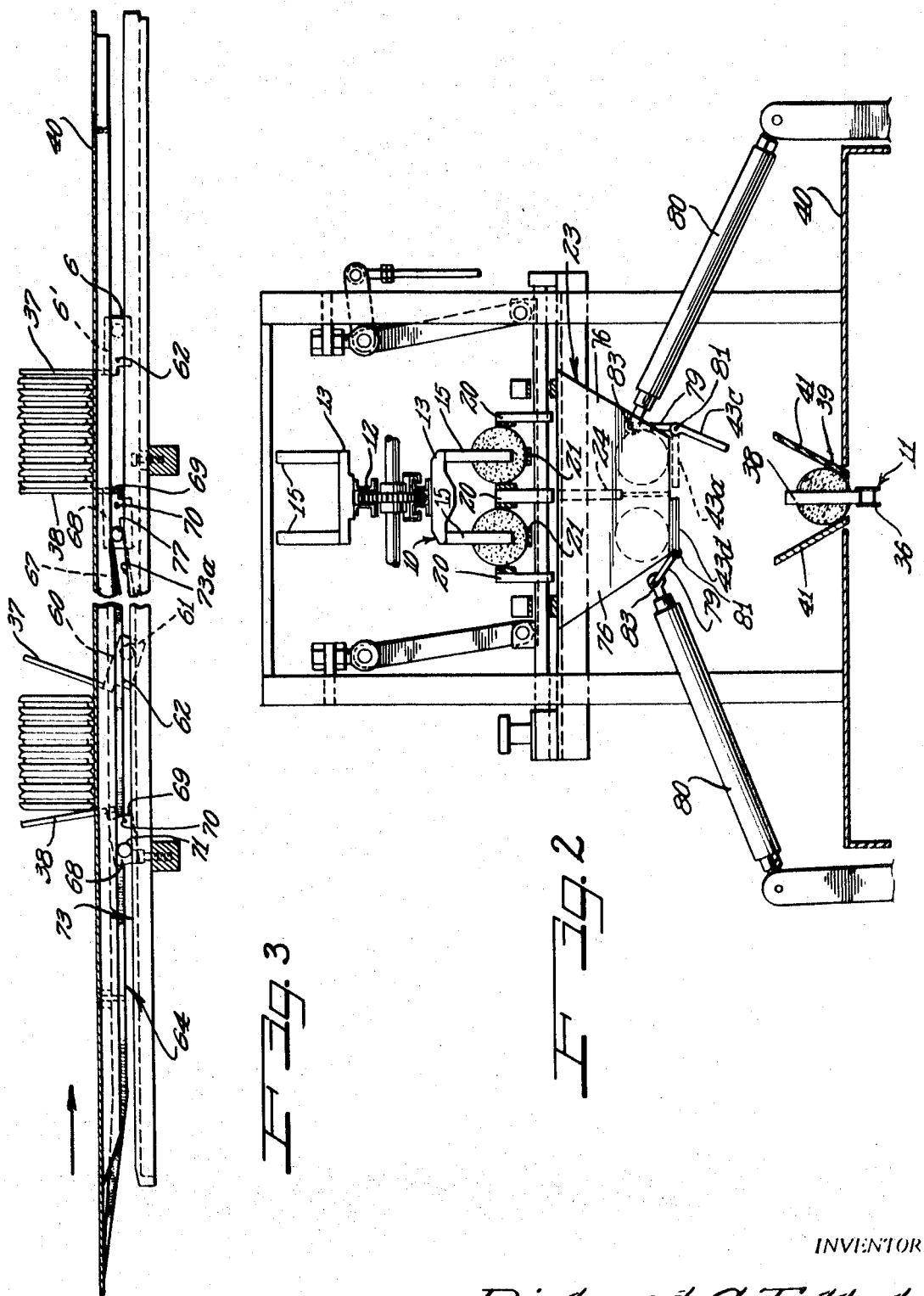

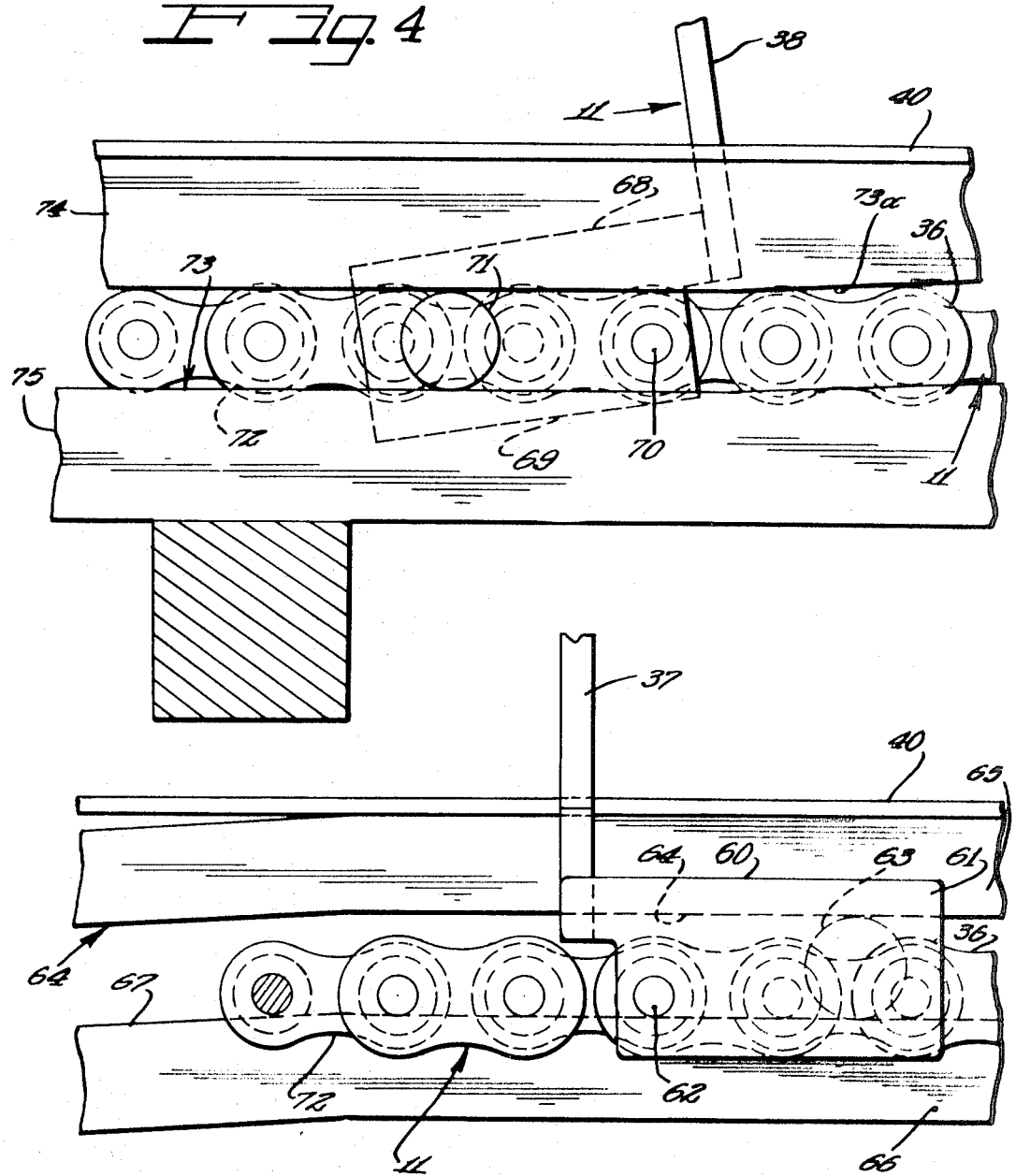

CONVEYOR RECEIVING AND CONVEYING ROWS OF ARTICLES IN PRESELECTED GROUPS FOR WRAPPING

This application is a division of my application Ser. No. 717,688, filed Apr. 1, 1968 now Pat. No. 3,500,984, and entitled "Converger and Feeder For Cookies For Wrapping."

SUMMARY OF THE INVENTION

The invention is generally directed to a conveyor for receiving groups of cookies deposited on the conveyor from above and conveying the groups of cookies to a wrapping machine. The conveyor is in the general form of a chain and flight conveyor having a horizontal material-carrying run with groups of flights extending upwardly of the horizontal material-carrying run, in which each set of flights is moved into angularly extending open positions as cookies or other articles are dropped to the conveyor to form a hopper effect, for receiving the cookies, and are closed as the cookies or other articles are carried to the wrapping machine to carry the cookies for wrapping in preselected counted groups in abutting relation with respect to each other.

A principal object of the present invention, therefore, is to provide a simple and improved form of conveyor, particularly adapted to convey cookies for wrapping, so arranged as to open to accommodate groups of cookies to be supplied thereto by dropping onto the conveyor and to bring the cookies in vertical positions for wrapping in preselected groups.

Still another object of the invention is to provide an improved form of single strand conveyor, conveying counted groups of articles for wrapping, and receiving and conveying the articles in a more expeditious and simple manner than formerly.

Other objects, features and advantages of the invention will be readily apparent from the foregoing description of a preferred embodiment, taken in conjunction with the accompanying drawings, although variations and modifications may be effected without departing from the spirit and scope of the novel concepts of the disclosure.

DESCRIPTION OF THE DRAWINGS

FIG. 1 is a fragmentary, generally perspective view of the delivery end portion of a transfer conveyor of a cookie separating and counting apparatus, showing a cookie-wrapping conveyor in cookie-receiving relation with respect to the transfer conveyor and showing the converger of the present invention adapted to converge rows of cookies delivered by the transfer conveyor for delivery into the wrapping machine conveyor, in single rows in preselected groupings.

FIG. 2 is a generally diagrammatic transverse sectional view taken through the transfer conveyor, and showing certain details of construction of the converger of the present invention.

FIG. 3 is a fragmentary longitudinal sectional view taken along the wrapping machine conveyor.

FIG. 4 is an enlarged fragmentary longitudinal sectional view illustrating certain details of a trailing flight of the wrapping machine conveyor.

FIG. 5 is a view somewhat similar to FIG. 4, but showing certain details of a leading flight of the wrapping machine conveyor.

DESCRIPTION OF PREFERRED EMBODIMENT OF INVENTION

In the embodiment of the invention illustrated in the drawings, I have shown in FIGS. 1 and 2 a transfer conveyor 10, disposed above a wrapping machine conveyor 11, and having laterally and longitudinally spaced flights 15 taking counted groups of cookies in parallel rows from a counting conveyor, (not shown), which separates the cookies into counted preselected groups and supplies the groups of cookies in two parallel spaced rows to the transfer conveyor 10.

The transfer conveyor 10 and counting conveyor are shown and described in my U.S. Pat. No. 3,290,859, dated Dec. 13, 1966. The details of the counting conveyor and transfer conveyor, therefore, need not be shown or described herein.

The transfer conveyor 10, as shown in FIGS. 1 and 2 generally includes an endless chain 12 having spaced flights or attachments 13 secured thereto. Each attachment 13 has a pair of laterally spaced conveyor flights 15, 15 extending downwardly between outer side rails 20,20 for conveying the rows of cookies along drop gates 21,21 forming the material carrying surfaces of the conveyor. The drop gates 21 are movable laterally to drop two rows of counted cookies in preselected groups into a hopper 23, disposed beneath said transfer conveyor, of sufficient width to receive two side-by-side rows of cookies, and of sufficient length to receive at least two groups of cookies in each row. A divider 24 extends along the center of the hopper 23 in alignment with the intermediate rail 20 to retain the cookies dropped by the drop gates 21 to each side of the hopper.

The wrapping conveyor 11 is shown as being a single strand chain and flight type of conveyor including an endless chain 36 having vertically extending leading and trailing flights 37 and 38, respectively, spaced therealong. The chain 36 is trained for movement along a slot 39 extending along the center of a tabletop 40 for the wrapping conveyor, and in direct alignment with a centerline midway between the flights 15,15 of the transfer conveyor 10. Diverging sidewalls 41 diverge from opposite sides of the slot 39 and are mounted on the tabletop 40 by angle brackets 42. The sidewalls 41 terminate closely adjacent leading drop bottoms 43a and 43b and trailing drop bottoms 43c and 43d pivotally mounted on opposite lower side portions of the hopper 23. The drop bottoms 43a and 43c are on one side of the hopper 23, while similar drop bottoms 43b and 43d are on the opposite side of the hopper. Said drop bottoms may be operated in various desired sequences to drop and guide cookies in said hopper into the space between the diverging sidewalls 41 of the wrapping conveyor, as will hereinafter be more clearly described as this specification proceeds.

A speed reducer of a conventional form is driven from the drive mechanism for driving the transfer conveyor 10, through a chain and sprocket drive (not shown). The drive to the transfer conveyor 10 is like that shown and described in my prior U.S. Pat. No. 3,290,859, so need not herein be shown or described further.

The speed reducer has a drive shaft (not shown) which serves to drive a countershaft 51 through a chain and sprocket drive 52. The countershaft 51 in turn serves as a drive shaft for the wrapping conveyor 11 through a chain and sprocket drive 53 driving a drive shaft 55 journaled in a mounting frame 56 mounted on and extending upwardly of the base for the apparatus. The drive shaft 55 has a sprocket 57 thereon driving a conveyor drive shaft 59 through a chain and sprocket drive 58. The drive shaft 59 has a conventional sprocket (not shown) keyed or otherwise secured thereto, meshing with the conveyor chain 36 of the wrapping machine conveyor 11, for driving said conveyor chain in the same direction as the transfer conveyor chain 10. The reduction gearing of the speed reducer, and the chain and sprocket drives 52, 53 and 58 provide the proper reduction in speed to time travel of the flights 37 and 38 with travel of the flights 15, to position the flights 37 and 38 to receive two groups of cookies in the spaces therebetween, each time the drop bottoms 43 on opposite sides of the hopper 23 are alternately operated to drop and converge two rows of cookies in said hopper into a single row, as discharged onto the wrapping conveyor 11.

The leading flights 37 and trailing flights 38 are shown in FIG. 4 as pivoted to the chain 36 and guided or cammed to incline the leading flights in a forward direction with respect to the chain 36 and incline the trailing flights in a rearward direction with respect to said chain as passing beneath the hopper 23, and to then move the leading and trailing flights generally perpendicular with respect to the chain 36 and tabletop 40, as the flights move towards the discharge end of the packaging conveyor to close the space between the leading and trailing flights and to hold the cookies of the groups of cookies in generally vertical positions with respect to the conveyor, to be inserted in the wrapping machine wrapper, in a manner which is not herein shown or described since it forms no part of the present invention.

The leading flight 37 extends upwardly of a generally U-shaped mounting member 60 having parallel spaced straps 61 extending in advance of the flight 37 along opposite sides of the chain 36. A pivot pin 62, which may be a pintle pin, pivotally connects the straps 61 to the chain 36, to pivot about a transverse axis disposed in advance of but closely adjacent the flight 37. A follower lug 63 extends outwardly of one strap 61 and has engagement with a camming slot 64 disposed beneath and extending along the tabletop 40, to one side of the slot 39. The camming slot 64 is formed between two vertically spaced camming strips 65 and 66 suitably mounted on the underside of the tabletop 40 and so formed as to incline the leading flight 37 about the axis of the pintle pin 62 to lead said pintle pin when passing beneath the hopper 23. The camming slot 64 has a sloping camming surface 67 sloping upwardly toward the discharge end of the conveyor to cam the flight 37 into a generally vertical position toward the discharge end of the conveyor to close the space between the flights 37 and 38.

In like manner the trailing flight 38 is mounted on the chain 36 on a mounting bracket 68 having parallel spaced straps 69. A pivot pin 70 which may be a pintle pin connecting two links of the chain together and disposed closely adjacent the flight 38, is provided to pivotally mount said flight on the chain 36. The straps 69 extend rearwardly of the flight 38. A follower lug 71 extends from one strap 69 on the opposite side of the chain from the follower lug 63 and engages a camming surface 73 formed between two vertically spaced camming straps 74 and 75. The camming surface 73 holds the trailing flight 38 in generally receding relation with respect to the flight 37 to be inclined backwardly from the chain 36, to provide a generally hopperlike space between the flights for receiving a group of cookies each time a drop bottom 43 is released. The camming surface 73 has a sloping surface 73a sloping upwardly as the fights 38 leave the hopper 23, to move the flights 38 into parallel relation with respect to the flights 37, and hold the articles in closed vertical positions for wrapping.

Referring now in particular to the hopper 32 and the drop bottoms 43 of said hopper, the hopper 23 has two pairs of aligned oppositely sloping sidewalls 76 converging toward the sidewalls 41 of the wrapping conveyor 11, to position the drop bottoms 43 on opposite sides of said hopper to successively drop a row of cookies onto the wrapping conveyor 11.

As shown in FIGS. 1 and 2 the converging sidewalls 76 on each side of the hopper are spaced apart at their adjacent ends to leave a gap therebetween, for crank arms 79 and links 80 pivoted thereto. Said crank arms and links serve to operate the drop bottoms 43 independently of each other, and in preselected timed relation with respect to each other. The lengths of the converging sidewalls 76 are such as to receive preselected groups of cookies transferred thereto by the transfer conveyor 10, each time the drop gates 21 are moved out of supporting relation with respect to the cookies. A first drop bottom 43a interleaves the lower end portion of a wall 76 and is pivotally connected thereto as by a pivot pin 81. The second, third and fourth drop bottoms 43b, 43c and 43d are pivotally connected to the respective sidewalls 76 by similar pivot pins 81. The cranks 79 are keyed or otherwise secured to the inner ends of the pivot pins 81 and extend upwardly therefrom within the gap between the adjacent ends of the sidewalls 76 and are pivotally connected to the links 80 as by pivot pins 83.

The links 80 are operated by cam and leverage arrangements to operate the drop bottom 43a, 43b, 43c and 43d in the required sequence to drop groups of cookies between the flights 37 and 38 of the wrapping conveyor 11, in a manner similar to that shown and described in my parent application Ser. No. 717,688, so not herein shown or described further.

I claim as my invention:

1. A conveyor for successively receiving and conveying single rows of articles in preselected groups for wrapping and like operations comprising:
   a single strand endless chain having a material-carrying run moveable in a generally horizontal plane,
   connected straps extending along opposite sides of said single strand chain and transversely pivoted thereto at intervals therealong,
   flights mounted on and extending upwardly of said straps on the material-carrying run of said endless chain,
   at least one strap of each pair of connected straps having a leading flight extending upwardly therefrom, having a follower extending outwardly therefrom,
   at least one strap of said connected straps having a trailing flight extending upwardly therefrom, having a follower extending outwardly therefrom in an opposite direction from the follower extending from the leading flight, and
   control means for said flights comprising cam means extending along opposite sides of said single strand chain and having camming engagement with said followers for inclining the leading flights forwardly with respect to said chain and inclining the trailing flights rearwardly with respect to said chain and moving said flights into generally vertical positions to close the spaces between the groups of articles and maintain the articles of the groups of articles in parallel relation with respect to each other, as they approach the discharge end of said conveyor.

2. The conveyor of claim 1,
   wherein the connected straps extending along the outsides of the single strand chain extend forwardly of the leading flights and rearwardly of the trailing flights,
   wherein the straps extending forwardly of the leading flights are pivoted to the chain in spaced relation with respect to the material-engaging surface of the flight, and
   wherein the straps extending rearwardly of the trailing flight are pivotally connected to said chain in horizontal offset relation with respect to the article-engaging surfaces of the trailing flights.

3. In a conveyor for cookies and the like arranged to receive groups of cookies dropped thereonto and convey the cookies in preselected groups for wrapping,
   a table having a flat top having a slot extending therealong and having sidewalls extending along opposite sides of said slot and diverging from said slot as they extend vertically therefrom,
   a single strand endless chain guided for movement along said table beneath the top thereof and in vertical alignment with said slot and upper horizontally movable material carrying run,
   means for continuously driving said endless chain,
   sets of leading and trailing flights spaced along said chain, and extending upwardly of the material-carrying run thereof through said slot between said diverging sidewalls and adapted to have groups of cookies successively deposited between said leading and trailing flights and said diverging sidewalls,
   means pivotally connecting said flights to said chain to move about generally horizontal axes extending transversely of said chain,
   and cam and follower means controlling said flights and inclining said leading and trailing flights of each set of leading and trailing flights angularly outwardly with respect to each other with respect to the direction of travel of the chain to form in effect a hopper to receive groups of cookies deposited therebetween, and angularly inwardly toward each other into generally vertical positions to bring the groups of cookies into engagement with each other to close the spaces between the groups of cookies, and hold said cookies in vertical positions for wrapping.

4. A conveyor in accordance with claim 3
   wherein connected straps extend along opposite sides of said single strand chain and are transversely pivoted thereto at intervals therealong, wherein said flights are mounted on and extend upwardly of said straps when on their material-carrying runs, wherein said straps extend forwardly of the leading flights and rearwardly of the trailing flights, wherein the cam and follower means include at least one strap of each set of connected straps extending forwardly of the leading flights and have a follower extending laterally outwardly therefrom, wherein at least one strap of the connected straps trailing each trailing flight has a follower extending outwardly therefrom in an opposite direction from a follower extending from the leading flight, and cam means extending along opposite sides of said single strand chain and having camming engagement with said followers for inclining the leading and trailing flights outwardly with respect to each other and with said diverging sidewalls forming a traveling hopper, and moving the leading and trailing flights into generally vertical positions to close the spaces between the groups of cookies carried thereby as they approach the discharge end of said conveyor for wrapping.

5. The conveyor of claim 4, wherein the connected straps are transversely pivoted to the chain forwardly of the cookie-engaging surfaces of the leading flights and rearwardly of the cookie-engaging surfaces of the trailing flights and are disposed beneath the top of said table and in alignment with said slots throughout the entire travel of said flights along said slots.

* * * * *